Patented Aug. 13, 1940

2,211,495

UNITED STATES PATENT OFFICE 2,211,495

METHOD OF PREPARING A COMPOSITION FOR USE IN PAINTS

John W. Church, Painesville, Ohio, assignor to The Tremco Manufacturing Company, Cleveland, Ohio, a corporation of Ohio No Drawing. Application August 3, 1937, Serial No. 157,160

4 Claims. (Cl. 134—58)

My invention relates to coating compositions, and more particularly to a method of preparing a composition for use in paints to produce an improved coating composition which has novel and desirable characteristics and which is suitable for direct application to porous surfaces without a priming coat.

In preparing paints for application to porous surfaces of material utilized in building construction, such as wood, brick walls, plaster or plaster board, it is customary to utilize one or more pigments, a vehicle, such as a vegetable drying oil or semi-drying oil, together with resins, volatile thinners, driers and the like. When such paints are applied directly to porous surfaces, however, color differences in tints or variations in the gloss or sheen of the paint frequently occur. It is consequently necessary when utilizing such paints to first apply a priming or sealing coat to prevent uneven penetration of the main coating which is subsequently applied.

My invention aims to provide an improved coating composition which may be applied directly to porous surfaces of material utilized in building construction and by means of which an even and uniform coating may be obtained without the necessity of utilizing a priming or sealing coating. The efficacy of my improved paint in providing a uniform, smooth coating, irrespective of the porosity of the building construction surface to which it is applied, is due to the fact that the pigments which are employed to provide the desired hiding power and other physical properties are bound to the vehicle by adsorption and are not detracted therefrom by the capillarity of porous surfaces of the type specified. My improved coating composition as prepared, however, permits sufficient penetration of the thinner or vehicle, or both, into the porous surface to provide the necessary adhesion.

It is therefore an object of my invention to provide an improved coating composition which may be applied to porous surfaces of material utilized in building construction without utilizing a priming or sealing coating and by means of which a nonglaring coating having a uniform surface and a soft glow may be provided.

Another object of my invention is to provide an improved coating composition in which the pigment or pigments contained therein are bonded or cemented to the vehicle in such a manner that a uniform sheen is provided when the composition is applied to porous surfaces of material utilized in building construction but which permits sufficient penetration of the vehicle or thinner, or both, into the porous surface to provide adhesion.

A still further object of my invention is to provide an improved process of preparing coating compositions for application to walls or similar porous surfaces by means of which moisture or gaseous films are removed from one or more pigments having the desired physical properties and a vehicle is bonded or cemented thereto in such a manner that the adsorption power of the pigment for the vehicle is greater than the capillary power of the porous surface to which the composition is applied, the composition being of such a nature, however, that sufficient penetration is permitted to provide adherence of the coating to the surface to which it is applied.

Various means have heretofore been proposed for preventing the uneven penetration of the vehicle constituents of paints into porous surfaces of material utilized in building construction, such as the use of blown vegetable oils, metallic soap gels or prewet pigments. The utilization of blown oils, however, frequently results in serious packaging difficulties because the pigments settle from the oil. Furthermore, the change in the viscosity effected during the blowing operation continues after the blowing operation ceases, thereby increasing the body of the paint which makes it difficult to apply. The use of metallic soap gels is disadvantageous in that such gels are unstable and grow in particle size until they are no longer gels. The paint or plastic containing the soaps consequently loses its nonpenetrating qualities upon ageing. Prewet pigments, formed by mixing an alkaline earth metal or magnesium carbonate with a water soluble acid, such as benzoic acid, acetic acid, abietic acid or rosin, and treating the mixture to prolonged attrition in a ball, pebble or rod mill, is dependent for nonpenetration on securing and maintaining deflocculated paint systems. Such paints, however, are characterized by possessing extreme flow and the pigments settle in a hard mass at the bottom of the vessel. If the system is flocculated to overcome these objections, the paint loses its nonpenetrating properties.

The methods which have heretofore been proposed for rendering paints nonpenetrating also have the distinct disadvantage that when applied to surfaces of varying porosity they must be made entirely nonpenetrating. Consequently, serious adhesion difficulties arise.

In accordance with my invention, a vehicle is first prepared which has good wetting properties for the pigments which are to be utilized in the coating composition. For instance, I may utilize a kettle bodied or blown vegetable drying oil such as linseed, China-wood or perilla oil, although I do not desire to be limited in this respect as blown or bodied vegetable semi-drying oils, such as corn oil, or cottonseed oil, may be employed. Instead of providing a blown or bodied vegetable oil, the desired body may be obtained by the combination of a vegetable drying or semi-drying oil and a resin or gum, such as ester gum, tragacanth, dammar or copal, or the resins or gums specified may be utilized in combination with a blown or bodied drying or semi-drying oil. I prefer to utilize a blown or bodied vegetable drying oil, together with a gum or resin, such as ester gum, and an appropriate thinner, such as gasoline or other light petroleum distillates to reduce the consistency of the vehicle. In this manner a vehicle having the desired body and wettability is obtained.

In preparing my improved coating composition when a plurality of pigments are employed, the pigments are preferably selected and introduced into the vehicle in the inverse order of their wettability. The degree of wettability of the pigments is determined by taking a test quantity of each pigment and mixing it with a given quantity of a good wetting liquid, such as kettle bodied linseed oil, the pigment having the best wettability being the one which gives the least flocculation.

The pigment having the lowest degree of wettability is first mixed, preferably at intervals, with a portion of the vehicle in such proportion that a heavy paste is obtained which provides approximately the maximum resistance to the stirring apparatus. The mixing may be performed in a heavy lead or dough mixer, a rubber mill or a Banbury mixer, and is continued until no change upon further mixing is discernible.

During the mixing operation, any gas or moisture films adhering to the pigment particles are dislodged and are displaced by a film of the nonvolatile vehicle which is firmly held or cemented to the pigment by the tremendous force of adsorption and is not detracted therefrom by the capillarity of the building surface to which the paint is applied.

The pigment having the next higher degree of wettability is then mixed in a similar manner into the paste, together with a sufficient quantity of the vehicle, to again form a thick paste of the type specified and the mixing is continued until any gas or moisture films surrounding the pigment are removed and the nonvolatile vehicle is firmly bound to the pigment by adsorption.

Any additional pigments having still higher degrees of wettability which may be desired in the finished paint are then added, one by one, in the inverse order of wettability, as before, together with a sufficient quantity of the vehicle to form a thick paste, and mixed in the same manner as the other pigments to dislodge the gas or moisture films, the amount of oil or varnish alone, or in combination with a thinner, in each case being such that the final product is a very heavy tough and masticated paste.

During the operation of mixing the pigments with the vehicle, the heavy paste becomes warm or even hot and there is a noticeable evolution of gas until the mixing is completed. By selecting the order in which the various pigments are added, the nonvolatile portion of the vehicle is brought into such intimate contact with the pigment particles that any gas or moisture films adhering to the pigment particles are dislodged and displaced by the nonvolatile vehicle film. The nonvolatile vehicle is thus firmly held or bound to the pigment particles by adsorption.

Various modifications may be made in the foregoing procedure. For instance, if more than two pigments are employed in the coating composition, the pigment having the lowest degree of wettability may be first added to a portion of the vehicle in sufficient proportions to form a thick paste and the additional pigments, if small in amount, may be added without adding additional vehicle. It is essential, however, to form a thick masticated paste and to mix the paste sufficiently to dispel the gas or moisture and bind or cement the vehicle to the pigment.

After the mixing operation is effected, the system may exhibit the properties of a deflocculated dispersed system distinguished by flow, or may exhibit the properties of a gel, depending upon the particle size of pigments and the characteristic of the vehicle employed. In any event, it is a system of high viscosity and must be thinned to obtain a coating composition which is capable of application by the usual methods. I preferably first add a sufficient amount of a thinner to form a paste which may be ground in a conventional paint mill, although this step is not necessary, and then add the remainder of the thinner. Petroleum distillates, such as benzine or kerosene, may be utilized as thinners. Suitable driers and flocculators are also added.

In preparing my improved coating composition in the form of a flat wall paint, I utilize a vehicle having a body of approximately U to W on the Gardner-Holt scale in which the nonvolatile constituents are sufficiently high to secure deflocculate mixing consistency and high film integrity in the applied coating. The proportion of nonvolatile vehicle constituents, however, should be maintained below an amount which will produce a glossy film. A petroleum distillate is preferably employed during the mixing operation and a petroleum distillate is added as the principal thinning constituent after the mixing operation. Water is added as a flocculating agent. A coating composition, thus prepared, has easy brushing properties and which while allowing sufficient penetration into porous surfaces to which the paint is applied to provide the necessary adhesion, will not allow sufficient penetration of the nonvolatile vehicle into the porous surfaces to cause color differences in tints over surfaces of uneven suction.

The following specific example will serve to illustrate and explain my invention, although it will be understood that I do not desire to be limited to the particular procedure or the particular ingredients or proportions specified therein.

A vehicle having the desired body and constituents was first prepared. This was accomplished by placing approximately 95 gallons of refined perilla oil in a Monel metal kettle which was heated to a temperature of approximately 600° F. 3.7 pounds of calcium acetate were then thoroughly mixed with the oil to neutralize any free fatty acids. The oil was heated to approximately 628° F. and held at that temperature for from 40 to 60 minutes in order to provide a bodied oil having approximately a 1½ inch string when cool. The increase in viscosity of the batch was checked by adding 37 pounds of ester gum which was stirred in well, the stirring being continued until the temperature fell to approximately 450° F. 50 gallons of a high grade gasoline were then added while stirring. It will be noted that the vehicle contains a kettle bodied drying oil and a gum, and that a thinning liquid is added to provide a body of the proper consistency and to limit the proportion of the nonvolatile constituents to an amount which will provide flatness of film in the applied coating.

Approximately 8 gallons of the vehicle, thus prepared, were placed in a lead mixer and 300 pounds of a calcined commercial white pigment containing approximately 30 parts of titanium oxide and 70 parts of calcium sulphate were added. This pigment has good hiding power but poor wettability. The pigment was added slowly in batches at intervals of approximately 5 minutes and thoroughly mixed with the kettle bodied oil until any moisture or gas films adhering to the pigment were dislodged. During the mixing operation the removal of gas and moisture films from the pigment particles had the tendency to reduce the viscosity of the paste. At such times, however, additional pigment was added which maintained the paste at such a heavy, tough consistency that approximately the maximum resistance was provided to the stirring apparatus.

To the mixture thus obtained, 12½ pounds of zinc oxide, which has a higher degree of wettability than the titanium oxide-calcium sulphate pigment, were next added and the mixing operation was continued until gas or moisture films upon the zinc oxide were displaced. The zinc oxide being small in amount was introduced without additional vehicle and of course increased the consistency of the paste which had the tendency to thin during the stirring operation after the final addition of the titanium oxide-calcium sulphate pigment. The zinc oxide is added to facilitate the drying operation and, if desired, may be omitted. Approximately 25½ pounds of Asbestine, which is a commercial substance composed of magnesium silicate or fibrous talc, were then added as a suspension agent and mixed in well to form a thick paste without adding further vehicle. The Asbestine aids in the suspension of the particles and thus prevents undue settling of the composition in the bottom of containers in which it is placed. It has a lower wettability than the zinc oxide, and, if desired, may be added prior to the zinc oxide.

Approximately 4 gallons more of vehicle, 200 pounds of a prewet pigment and approximately 3 pounds of litharge were then added and mixed well into the mass. The prewet pigment is formed by mixing an alkaline earth metal carbonate or magnesium carbonate with rosin or a water soluble acid, such as abietic or benzoic acid, and treating the mixture to prolonged and violent attrition in a ball, rod or pebble mill. The preparation of this pigment is fully described in Patent No. 2,034,797 granted to Church et al. on March 24, 1936, and possesses a high degree of wettability. The litharge is added to prevent the adsorption of the drier, which is subsequently added, by the titanium oxide-calcium sulphate pigment.

Instead of adding a prewet pigment, however, an alkaline earth metal or magnesium carbonate may be added and the mixture stirred until the moisture is removed from the pigment and a film of the vehicle is cemented or bonded to the pigment particles. After each pigment was added, the mixing operation was continued for a sufficient time to remove the gas or moisture films and to bind the nonvolatile constituents of the vehicle to the pigment particles. This usually requires from approximately 5 to 15 minutes although the mixing may be continued for longer periods if desired.

From the foregoing example it will be noted that the titanium oxide-calcium sulphate pigment is added slowly at intervals to the vehicle, the amount of pigment which is finally added ranging from approximately 35 to 40 pounds per gallon of vehicle. This pigment contains a considerable amount of moisture and by adding the pigment at intervals to the vehicle, a slurry is first formed and the moisture and gas are removed from the pigment during the mixing operation. As additional batches of pigment are added, however, a thick paste is formed and maintained which provides approximately the maximum resistance to the stirring apparatus during the stirring operation and the vehicle becomes thoroughly bonded to the pigment particles from which the moisture or gas films have been removed. The zinc oxide and magnesium silicate which do not contain as much moisture or gas as the titanium oxide-calcium sulphate pigment may then be added without additional vehicle. The prewet alkaline earth metal pigment is substantially free from moisture. It is added, together with an additional amount of vehicle, and the mixing continued until the vehicle and pigment is thoroughly mixed with the mass in the form of a thick paste. By utilizing such a process, any gas or moisture films are removed from the surface of the pigment particles and they are closely coated with a film of the vehicle.

To this mixture which is in the form of a thick paste and at a temperature of about 85° F., approximately 3½ gallons of kerosene were mixed to provide a smooth paste which was passed through a stone or roller mill into a vessel containing approximately ½ gallon of kerosene, the additional kerosene being placed in the vessel to prevent solidification of the heated material as it flows into contact with the cold wall surfaces of the vessel.

Approximately 3 more gallons of kerosene were then added and the pasty mass was thoroughly mixed in a high speed paint agitator. To this mass which is in the form of a thick slurry approximately 34 ounces of water were added. The water causes an emulsion to form which reduces the flowability of the material. In other words, the water causes the formation of a thixotropic body, that is, one which is thick when at rest and sufficiently thin when stirred to enable it to flow.

A thinner consisting of approximately 5½ gallons of kerosene and 6 gallons of a high grade gasoline was then added and mixed well into the mass. Finally, approximately 17 ounces of cobalt napthanate drier containing approximately 60 per cent of cobalt and 20 ounces of lead naphthanate drier containing approximately 24 per cent of lead were added.

From the foregoing example it will be noted that in general the pigments are added in the inverse order of their wettability. For instance, the titanium oxide-calcium sulphate pigment which has the lowest degree of wettability was first mixed with a portion of the vehicle after which the zinc oxide, which has the next higher degree of wettability, was added, and finally the prewet pigment, which is preferably calcium carbonate coated with a film of the calcium resinate, together with the remainder of the vehicle, were introduced and mixed with the other pigments.

I do not desire, however, to limit my invention to this exact procedure as it is possible to obtain satisfactory results even when some of the pigments are added without respect to their wettability. For instance, in the foregoing example the Asbestine, which has a lower degree of wettability than the zinc oxide, was added after the zinc oxide. The amount of moisture or gas films associated with this pigment, however, is small and its addition after the zinc oxide does not materially affect the final product. It will be understood, however, that the Asbestine may be added prior to the zinc oxide.

The composition as finally produced has easy brushing characteristics and while allowing penetration of the thinner into porous surfaces to which the composition is applied, did not allow sufficient penetration of the nonvolatile vehicle to cause color differences over surfaces of uneven suction. My improved composition may be applied in a single coating over walls of varying porosity and has a soft glow free from glare. Under such conditions ordinary paints show spotting, flashing, fire cracks and the like unless a priming or sealing coat is first employed. In view of its easy spreading qualities it is possible to apply the composition very thickly without causing it to sag or run and excellent hiding power may therefore be obtained with a single coat.

In my improved process of preparing coating compositions containing a plurality of pigments, the order and method of mixing the pigments with the vehicle and the body and nature of the vehicle are of particular importance in providing a composition having a uniform smooth surface free from glare when applied. For instance, if the pigment having the greatest degree of wettability were first mixed with the oil the nonvolatile vehicle would become firmly attached to the pigment particles. Consequently, if pigments having a lower degree of wettability are subsequently mixed with such a system, proper wetting of the particles of the pigments having the lower degree of wettability with the vehicle would not be obtained. Dispersion would be incomplete and the bond between pigment particles and vehicle would be so loose that the vehicle would leave the particles and penetrate into a porous base when the composition is applied thereto.

In my improved process, however, the pigment having the lowest degree of wettability is first mixed with a vehicle of body U to W in the Gardner-Holt scale. As the pigment is added the moisture or gas films which are held to the pigment by adsorption are removed and the nonvolatile vehicle is bound or welded to the pigment particles. Some latitude, however, is allowed in the process. For instance, the zinc oxide and Asbestine may be added without introducing an additional amount of the vehicle. The prewet pigment, which is substantially free from moisture and gas films, may be added more quickly than the other pigments as it is only necessary in the case of this pigment to secure a firm bond between the pigment and the vehicle.

While in the examples specified I have enumerated various pigments which are employed in the preparation of my improved composition, it will be understood that I do not desire to be limited to any particular pigments, the essential features of my invention being to provide a composition which has deflocculate mixing consistency and a smooth flat finish and high film integrity when applied as a coating. This is accomplished by removing the moisture or gaseous films from the pigments and binding or cementing a nonvolatile vehicle thereto in sufficient proportions to provide flatness of film in the final coating. A sufficient amount of thinner or vehicle or both, however, should also be present to provide the necessary adhesion. For instance, lithopone or other pigments having high hiding power may be substituted for the titanium oxide-calcium sulphate pigment, and white lead may be substituted for the whiting. Various extenders or suspension agents may also be substituted for the Asbestine such as barytes, silica or the like. My invention, however, does not depend upon a plurality of pigments as good results may be obtained by my process even though a single pigment, such as a titanium oxide-calcium sulphate pigment or whiting, is employed alone. I prefer, however, to utilize a combination of pigments, such as those specified, because such a combination provides a pure white coating composition which may be applied as such or tinted to the desired shade.

My improved composition as prepared is heavy when at rest but flows when stirred. It becomes mobile under the brush and levels out but becomes heavy after an interval of time and provides a film having a soft glow and a velvety texture resembling a flat enamel. It has an angular but no direct sheen and does not spot, flash or show fire cracks due to the uneven penetration of the vehicle. The penetration is very slight and it is believed to be due almost entirely to the thinner.

From the foregoing description it will be seen that I have provided an improved coating in which the pigment or pigments are cemented or bonded to the vehicle in such a manner that they are not detracted therefrom by the capillarity of porous surfaces utilized in building construction. It will also be apparent that in the preparation of the composition, a vehicle is employed in which the nonvolatile constituent is present in such proportions that deflocculate mixing consistency is provided during the mixing of the pigment with the vehicle and high film integrity is provided in the applied coating. The nonvolatile vehicle, however, is maintained low enough to provide a coating having a rich satiny appearance resembling a flat enamel.

It will also be seen that I have provided an improved process of preparing a coating composition in which a pigment or plurality of pigments are employed and in which the body of the vehicle is maintained within a definite range and consists of nonvolatile and volatile constituents in such proportions that the composition when applied has a flat finish and in which the pigment or pigments are firmly bonded or cemented to the nonvolatile constituent.

It will also be apparent that I have provided an improved process of preparing a paint containing a plurality of pigments in which the pigments are introduced into a vehicle in such a manner that any moisture or gas films are removed from the pigment and the nonvolatile portion of the vehicle is firmly cemented or bonded to the pigment.

The term "material utilized in building construction" when utilized in the specification and claims refers to any material formed of wood, brick, plaster, plaster board or like material having surfaces of similar porosity.

What I claim is:

1. The method of preparing a composition for use in paints, which comprises introducing pigment material into a liquid, the nonvolatile portion of which consists predominantly of a vegetable drying oil, while stirring the mixture, the amount of pigment material introduced being sufficient to form a paste having a heavy, tough consistency which provides approximately the maximum resistance to the stirring apparatus, whereby heat is generated, and continuing the stirring while adding at intervals a sufficient additional amount of the pigment material to maintain the paste in its heavy, tough state until the pigment material is thoroughly dispersed in the oil, the moisture and gas films are removed from the pigment particles, the vegetable oil is firmly bonded thereto, and no further change on stirring is discernible.

2. The method of preparing a composition for use in paints which comprises introducing pigment material into a liquid comprising a vehicle composed essentially of a bodied vegetable drying oil and thinner in such relative proportions of vegetable drying oil and thinner as to provide a body of from substantially U to W on the Gardner-Holt scale, while stirring the mixture, the amount of pigment material added being sufficient to form a paste having a heavy tough consistency which provides approximately the maximum resistance to the stirring apparatus, whereby heat is generated, and continuing the stirring while adding at intervals a sufficient additional amount of the pigment material to maintain the paste in its heavy, tough state until the pigment material is thoroughly dispersed in the oil, the moisture and gas films are removed from the pigment particles, the vegetable oil is firmly bonded thereto, and no further change on stirring is discernible.

3. The method of preparing a composition for use in paints containing a plurality of pigments having different degrees of wettability, which comprises introducing a sufficient amount of the pigment having the lowest degree of wettability into a vehicle, the nonvolatile portion of which consists predominantly of vegetable drying oil, while stirring the mixture to provide a paste having a heavy tough consistency which provides approximately the maximum resistance to the stirring apparatus, whereby heat is generated, and continuing the stirring while adding at intervals a sufficient additional amount of the pigment to maintain the paste in its heavy, tough state until the pigment is thoroughly dispersed in the oil, the gas and moisture films are removed from the pigment particles, the vegetable oil is firmly bonded thereto, and no further change on stirring is discernible, adding a second pigment having a higher degree of wettability than the first pigment, together with a sufficient additional amount of the same vehicle to provide a heavy, tough paste which provides approximately the maximum resistance to the stirring apparatus, whereby heat is generated, and continuing the stirring while adding at intervals a sufficient additional amount of the second pigment to maintain the paste in its heavy, tough state until the pigment is thoroughly dispersed in the oil, the gas and moisture films are removed from the second pigment, the vegetable oil is bonded thereto and no further change on stirring is discernible.

4. The method of preparing a composition for use in paints containing a plurality of pigments having a different degrees of wettability, which comprises introducing a sufficient amount of the pigment having the lowest degree of wettability into a vehicle consisting predominantly of a vegetable drying oil and thinner in such relative proportions of oil and thinner as to provide a body of substantially U to W on the Gardner-Holt scale while stirring the mixture, said pigment being added in sufficient proportions to provide a paste having a heavy tough consistency which provides approximately the maximum resistance to the stirring apparatus, whereby heat is generated, continuing the stirring while adding at intervals a sufficient additional amount of the pigment to maintain the paste in its heavy tough state until the pigment is thoroughly dispersed in the oil, the moisture and gas films are removed from the pigment particles, the vegetable oil is firmly bonded thereto and no further change on stirring is discernible, adding a second pigment having a higher degree of wettability than the first pigment, together with a sufficient additional amount of the same vehicle to form a paste having a heavy tough consistency which provides approximately the maximum resistance to the stirring apparatus, whereby heat is generated, continuing the stirring while adding at intervals a sufficient additional amount of the second pigment to maintain the paste in its heavy tough state until the pigment is thoroughly dispersed in the oil, the gas and moisture films are removed, the vegetable oil is bonded to the second pigment, and no further change on stirring is discernible.

JOHN W. CHURCH.